US011141690B2

(12) United States Patent
Kruse Mortensen

(10) Patent No.: US 11,141,690 B2
(45) Date of Patent: Oct. 12, 2021

(54) SCRUBBER FOR CLEANING OF A GAS

(71) Applicant: ALFA LAVAL CORPORATE AB, Lund (SE)

(72) Inventor: Ruddi Kruse Mortensen, Nibe (DK)

(73) Assignee: ALFA LAVAL CORPORATE AB, Lund (SE)

(*) Notice: Subject to any disclaimer, the term of this patent is extended or adjusted under 35 U.S.C. 154(b) by 86 days.

(21) Appl. No.: 16/628,440

(22) PCT Filed: Jun. 19, 2018

(86) PCT No.: PCT/EP2018/066201
§ 371 (c)(1),
(2) Date: Jan. 3, 2020

(87) PCT Pub. No.: WO2019/025073
PCT Pub. Date: Feb. 7, 2019

(65) Prior Publication Data
US 2020/0215477 A1 Jul. 9, 2020

(30) Foreign Application Priority Data

Aug. 1, 2017 (EP) .................................... 17184161

(51) Int. Cl.
*B01D 47/06* (2006.01)
*B01D 53/18* (2006.01)
(Continued)

(52) U.S. Cl.
CPC ............. *B01D 47/06* (2013.01); *B01D 47/12* (2013.01); *B01D 53/1406* (2013.01); *B01D 53/18* (2013.01); *B01D 53/185* (2013.01)

(58) Field of Classification Search
CPC .. B01D 53/1406; B01D 53/18; B01D 53/185; B01D 47/06; B01D 47/12
See application file for complete search history.

(56) References Cited

U.S. PATENT DOCUMENTS 2,587,416 A * 2/1952 Vedder .................. B01D 47/06
96/321
3,131,237 A 4/1964 Collins
(Continued)

FOREIGN PATENT DOCUMENTS

CN 201534044 U 7/2010
CN 102489141 A 6/2012
(Continued)

OTHER PUBLICATIONS

International Search Report (PCT/ISA/210) and Written Opinion (PCT/ISA/237) dated Sep. 25, 2018, by the European Patent Office as the International Searching Authority for International Application No. PCT/EP2018/066201.
(Continued)

*Primary Examiner* — Robert A Hopkins
(74) *Attorney, Agent, or Firm* — Buchanan Ingersoll & Rooney PC

(57) ABSTRACT

A scrubber for cleaning a gas comprises a casing extending along a longitudinal central axis and enclosing a scrubbing chamber. The casing has a gas inlet and a gas outlet. The casing is configured to permit flow of the gas through the scrubbing chamber in a flow direction from the gas inlet to the gas outlet. A deflector device in the scrubbing chamber between the gas inlet and outlet forms a gas passage between the deflector device and the casing. The deflector device comprises an upstream surface facing the gas inlet. A spraying nozzle is configured to spray a scrubbing liquid into the scrubbing chamber and the gas flow. A separation device comprises a shield element and is arranged between the upstream surface of the deflector device and the gas inlet. The shield element shields the upstream surface from the gas flow and is perforated by a plurality of holes.

13 Claims, 4 Drawing Sheets

(51) Int. Cl.
    *B01D 53/14*     (2006.01)
    *B01D 47/12*     (2006.01)

(56) References Cited

U.S. PATENT DOCUMENTS

| | | | |
|---|---|---|---|
| 3,497,194 A * | 2/1970 | Hans | C21C 5/40 266/147 |
| 3,708,958 A | 1/1973 | Duty et al. | |
| 3,779,525 A | 12/1973 | Tanigawa et al. | |
| 4,318,717 A | 3/1982 | Sohier | |
| 5,292,353 A | 3/1994 | Kaufman et al. | |
| 2008/0066622 A1 | 3/2008 | Fang | |
| 2013/0269530 A1 | 10/2013 | Schulze et al. | |
| 2016/0016109 A1 | 1/2016 | Strandberg | |
| 2020/0179863 A1 | 6/2020 | Kruse Mortensen | |
| 2020/0206678 A1 | 7/2020 | Kruse Mortensen | |

FOREIGN PATENT DOCUMENTS

| | | |
|---|---|---|
| CN | 202438239 U | 9/2012 |
| CN | 103328616 A | 9/2013 |
| CN | 104316364 A | 1/2015 |
| DE | 102015105283 A1 | 8/2016 |
| EP | 2775112 B1 | 10/2015 |
| GB | 120304 A | 11/1918 |
| WO | 2016158571 A1 | 10/2016 |

OTHER PUBLICATIONS

European Search Report and European Search Opinion issued by the European Patent Office dated Jan. 5, 2018 in European Patent Application No. 17184161.2 (5 pages).

Office Action dated Jul. 19, 2021, by State Intellectual Property Office of People's Republic of China in corresponding Chinese Patent Application No. 201880050470.5. (8 pages).

\* cited by examiner

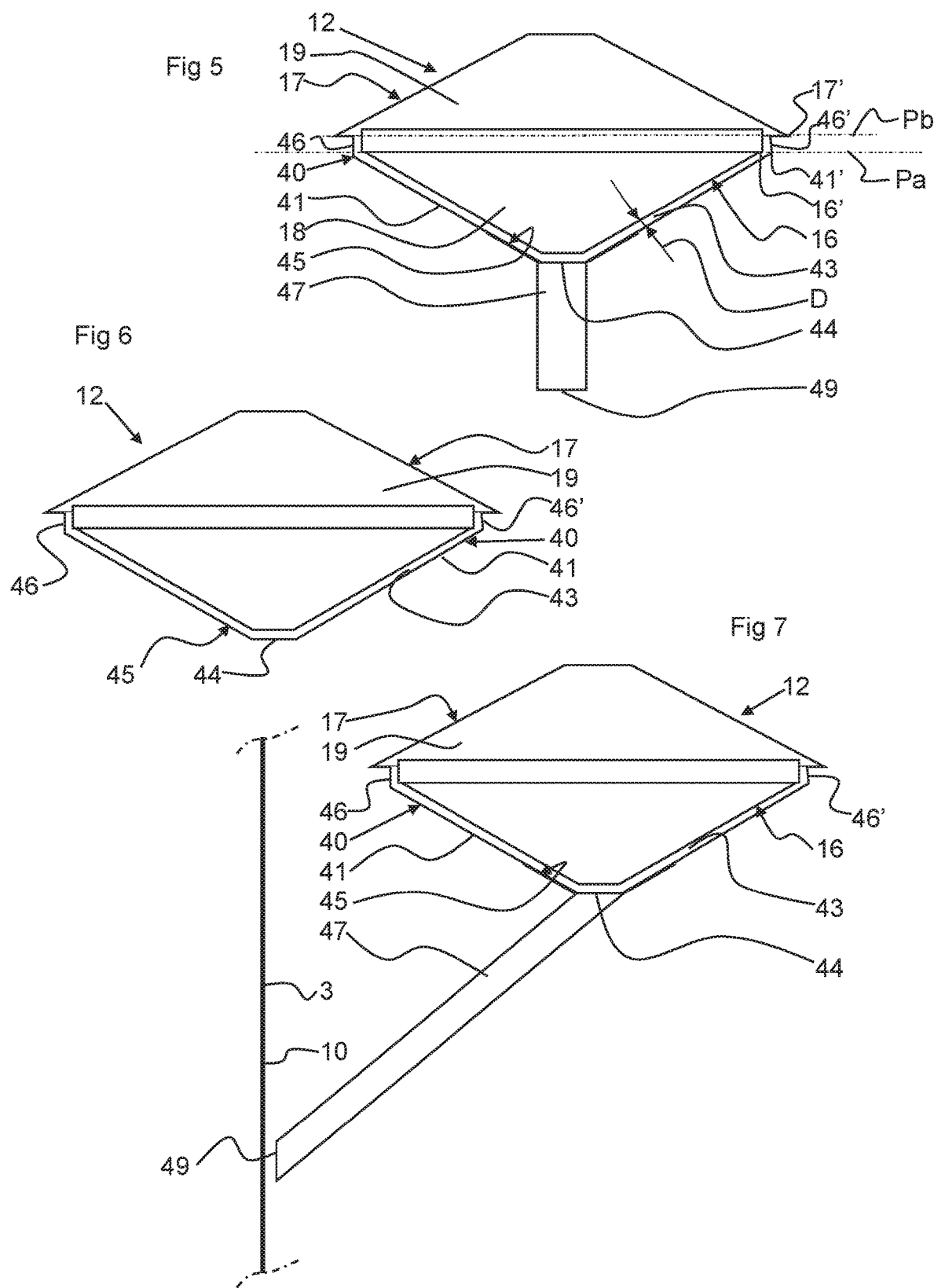

SCRUBBER FOR CLEANING OF A GAS

TECHNICAL FIELD OF THE INVENTION

The present invention refers generally to the cleaning of gases, especially exhaust gases from engines, burners, boilers, etc., especially in marine vessels. More precisely, the present invention refers to a scrubber for cleaning of a gas, comprising

- a casing extending along a longitudinal central axis and enclosing a scrubbing chamber, wherein the casing has a gas inlet for the gas to be cleaned, which extends into the scrubbing chamber, and a gas outlet for the cleaned gas, which extends out from the scrubbing chamber, wherein the casing is configured to permit a gas flow of the gas to flow through the scrubbing chamber in a flow direction from the gas inlet to the gas outlet,
- a deflector device provided in the scrubbing chamber between the gas inlet and the gas outlet and forming a gas passage between the deflector device and the casing, which deflector device comprises an upstream surface facing the gas inlet, and
- a spraying nozzle configured to spray a scrubbing liquid into the scrubbing chamber and the gas flow.

BACKGROUND OF THE INVENTION AND PRIOR ART

US 2016/0016109 discloses a vertical scrubber for exhaust gas from a marine vessel engine. An exhaust gas tube is substantially coaxially arranged through the bottom of a lower scrubbing chamber. An exhaust gas outlet is coaxially arranged through the top of an upper scrubbing chamber. A lower scrubbing chamber deflection body is arranged above the opening of the exhaust gas tube for redirecting the exhaust gas towards the walls of the scrubber and for creating turbulent gas flow. Lower chamber water injectors are arranged above the lower scrubbing chamber deflection body to introduce scrubbing water. A lower chamber exhaust gas outlet is arranged at the top of the lower scrubbing chamber as a coaxial constriction for withdrawing the partly scrubbed exhaust gas from the first scrubbing chamber and introducing the gas into the upper scrubbing chamber.

When operating a scrubber, or wet scrubber, for cleaning an exhaust gas from, for instance, a marine vessel engine, scrubbing liquid is sprayed into the scrubbing chamber, which may comprise one or more scrubbing sections, to react with the exhaust gas for removing contaminants, such as sulfur, soot and particles. In the case of inline scrubbers, like the above described scrubber, in order to ensure that the scrubbing liquid does not flow into the exhaust gas line of the marine vessel engine, one or more deflector devices are provided in the scrubbing chamber. One such deflector device may typically be positioned above the exhaust gas pipe to function as a cover. In order to minimize the overall footprint of the scrubber, the available area for the exhaust gas to pass is limited, and thus the gas velocity may be high, especially when the exhaust gas passes the deflector device. A high gas velocity makes it difficult to drain the scrubbing liquid in the scrubber since the scrubbing liquid typically should pass the same area in the opposite direction, i.e. through the exhaust gas flow, to be drained. The effect may cause entrainment of scrubbing liquid to a higher level in the scrubber, either in the same scrubbing section or the next scrubbing section.

During operation of a scrubber with one stage, i.e. one scrubbing section, scrubbing liquid may be entrained to a higher, or more downstream, position in the scrubber because of the high exhaust gas velocity and reduced draining capabilities. The entrainment of scrubbing liquid may have several disadvantages during the operation of the scrubber. It may increase scrubbing liquid hold up in the scrubber. It may significantly increase the back pressure. It may decrease the capability to drain scrubbing liquid from the scrubbing chamber. It may increase the risk of sulfur release at a more downstream level in the scrubber caused by an increased quantity of scrubbing liquid that has absorbed sulfur. It may reduce the capability to ensure a counter flow in the scrubber, which decreases the overall scrubber performance.

During operation of a scrubber with two stages or more, i.e. with an upstream scrubbing section and a downstream scrubbing section, scrubbing liquid may be entrained from the upstream scrubbing section to the downstream scrubbing section by the high exhaust gas velocity and by reduced draining capabilities. Also in this case, the entrainment of scrubbing liquid may have several disadvantages during the operation of the scrubber. It may increase scrubbing liquid hold up in the upstream scrubbing section. It may significantly increase the back pressure. It may decrease the capability to drain scrubbing liquid from the upstream scrubbing section. It may "pollute" the scrubbing process and the scrubbing liquid in the downstream scrubbing section with soot and particles. It may decrease the possibility to make an overall scrubbing liquid cleaning as the amount of "polluted" scrubbing liquid may be much higher in the downstream section than in the upstream section. It may demand a higher draining capacity in the downstream scrubbing section. It may increase the risk of sulfur release in the downstream section caused by an increased quantity of scrubbing liquid that has absorbed sulfur. It may reduce the capability to use a reflux system for circulating drained scrubbing liquid from the downstream section to the upstream section as described in EP 2775112.

SUMMARY OF THE INVENTION

An object of the present invention is to overcome the problems discussed above. More precisely, an object of the present invention is to reduce the entrainment of scrubbing liquid in a scrubber.

This object is achieved by the scrubber initially defined, which is characterized in that the scrubber further comprises a separation or "semi-demister" device, which comprises a shield element arranged between the upstream surface of the deflector device and the gas inlet and at least partly shielding the upstream surface from the gas flow, which shield element is perforated by a plurality of holes. Different designs and sizes of the holes are possible. For example, the holes may be circular, oval, triangular, etc. The separation device is arranged to separate scrubbing liquid from the gas flow.

The shield element is arranged so as to provide a collecting gap between the upstream surface and the shield element, and the holes extend through the shield element from the scrubbing chamber, or outside the shield element, to the collecting gap to permit scrubbing liquid to enter the collecting gap.

The separation device comprises a drain outlet configured to drain scrubbing liquid from the collecting gap. Scrubbing liquid may thus be drained from the collecting gap via the drain outlet. Scrubbing liquid drainage from the scrubber may take place upstream of the drain outlet of the separation device.

Without the separation device, droplets of the scrubbing liquid entrained in the gas flow would hit the upstream surface of the deflector device and could then be forced towards the gas outlet by the gas flow which could render drainage of the scrubbing liquid from the scrubber difficult. The scrubbing liquid drainage may take place upstream of the deflector device, i.e. between the gas inlet and the deflector device.

In a scrubber according to the present invention, when the gas flow reaches the shield element, droplets of the scrubbing liquid entrained in the gas flow will hit the shield element. Thanks to the plurality of holes, scrubbing liquid may pass through the holes and the shield element. The scrubbing liquid, containing the contaminants mentioned above, may then be collected downstream the shield element, i.e. between the shield element and the deflector device, and "shielded" from the gas flow. The gas flow will then be prevented from forcing the scrubbing liquid towards the gas outlet which may facilitate scrubbing liquid drainage from the scrubber.

The scrubbing liquid passing through the holes may thus be collected in the collecting gap. The dynamic pressure will vary in the scrubbing chamber. In particular, the dynamic pressure outside the shield element will be higher than in the collecting gap between the shield element and the upstream surface of the deflector device. This pressure difference may force the droplets, hitting the shield element, to enter the collecting gap via the holes. In the collecting gap the droplets may form a liquid flow downward, by gravity and pressure difference, along the upstream surface of the deflector device.

A width of the collecting gap, equal to a perpendicular distance between the shield element and the upstream surface of the downstream deflector device, may, but does not have to, be essentially uniform along the upstream surface.

According to an embodiment of the invention, the longitudinal central axis may be vertical or slightly inclined in relation to a vertical direction.

According to an embodiment of the invention, the gas inlet may be arranged below the gas outlet. The gas inlet and gas outlet may, or may not be, concentrically arranged.

According to an embodiment of the invention, the scrubber comprises a downstream scrubbing section adjacent to the gas outlet inside which the above deflector device, and if nothing else is said, the deflector device referred to below, is arranged as a downstream deflector device, and an upstream scrubbing section adjacent to the gas inlet inside which a further deflector device is arranged as an upstream deflector device. The separation device may be provided in the downstream scrubbing section at the downstream deflector device.

According to an embodiment of the invention, the shield element tapers towards the gas inlet. A tapering shape of the shield element contributes to guide the gas flow around the shield element at the same time as droplets of scrubbing liquid in the gas flow, which, because of difference in inertia, tend to continue straight forwardly towards the gas outlet, may be caught by the shield element.

According to an embodiment of the invention, the shield element comprises, or consists of, a portion defining a cone or a truncated cone, or a funnel, a center of which may coincide with the longitudinal central axis of the scrubber. The holes may extend through said portion.

According to an embodiment of the invention, the drain outlet extends from a central area of the shield element. With the tapering shape, in particular the shape of a truncated cone, the central area may be provided closest to the gas inlet, i.e. in a most upstream position. Scrubbing liquid flowing downwardly along the upstream surface of the deflector device may arrive at the central area and at the drain outlet.

The gas flow velocity may be relatively low along the longitudinal central axis of the scrubber, especially, in case of the scrubber comprising an upstream deflector device and a downstream deflector device, between the upstream and downstream deflector devices. According to an embodiment of the invention, the longitudinal central axis extends through the drain outlet of the separation device. Thereby, scrubbing liquid drainage may be facilitated since the scrubbing liquid may need to flow in a direction opposite to the gas flow direction to be drained from the scrubber.

According to an embodiment of the invention, the scrubber further comprises a drain pipe communicating with the drain outlet of the separation device. The scrubbing liquid from the collecting gap may thus be drained via the drain outlet through the drain pipe. The drain pipe may shield the scrubbing liquid from the gas flow and feed it to an area of the scrubber where the gas flow velocity is relatively low. Thereby, scrubbing liquid drainage may be facilitated. Scrubbing liquid drainage from the scrubber may take place upstream of a drain pipe outlet.

According to an embodiment of the invention, the drain pipe outlet may be arranged along the longitudinal central axis where the gas flow velocity, as mentioned above, may be relatively low. Particularly, the drain pipe may extend along the longitudinal central axis.

According to an embodiment of the invention, the drain pipe outlet may be arranged at an inner side of the casing. At the inner side of the casing, the flow velocity of the gas passing from the gas inlet to the gas outlet may be lower than at a distance from the inner side of the casing. The scrubbing liquid may then flow on the inner side of the casing to be drained form the scrubber.

According to an embodiment of the invention, the drain pipe extends towards the gas inlet. Thereby, especially in case of a scrubber having a vertical longitudinal central axis and the gas inlet arranged below the gas outlet, gravity may aid in scrubbing liquid drainage from the scrubber.

In case of the scrubber comprising an upstream deflector device and a downstream deflector device, the upstream deflector device may catch scrubbing liquid from the drain outlet of the separation device, via the drain pipe if such is present.

According to an embodiment of the invention, the separation device comprises an edge member extending from an outer edge of the shield element towards the gas outlet. The edge member may extend along the complete, or only one or more separated portions of, the outer edge. The edge member may prevent that scrubbing liquid that has passed through the holes and the shield element escapes and is forced towards the gas outlet by the gas flow. Further, scrubbing liquid that does not pass through the holes but remains on an upstream surface of the shield element, may be guided towards the gas outlet along the edge member. Means may be provided for catching the scrubbing liquid flowing on the edge member.

According to an embodiment of the invention, the edge member is formed as a wall.

According to an embodiment of the invention, the edge member extends in parallel with the longitudinal central axis.

According to an embodiment of the invention, the deflector device comprises a downstream deflector having a downstream surface facing the gas outlet, wherein a projection of the downstream deflector in a transverse plane extending perpendicularly to the longitudinal central axis is larger than a projection of the shield element in the transverse plane. Thereby, seen from the gas outlet, the downstream deflector may completely obscure the shield element to catch scrubbing liquid leaving the shield element. The projections may be uniform, for example circular, or not.

According to an embodiment of the invention, the edge member extends towards or to an upstream surface of the downstream deflector. The scrubbing liquid, being guided towards the gas outlet along the edge member, may thus be caught by the upstream surface of the downstream deflector.

According to an embodiment of the invention, the holes of the shield element cover a total hole area that is 25-45%, preferably 30-40%, and more preferably 35% of the total area of the shield element.

According to an embodiment of the invention, the shield element defines a space in which the deflector device is received such that the shield element at least partly encloses the upstream surface of the deflector device. This may facilitate the provision of a suitable collecting gap between the upstream surface of the deflector device and the shield element.

According to an embodiment of the invention, the upstream surface of the deflector device tapers towards the gas inlet. This may facilitate accumulation of the scrubbing liquid in the collecting gap flowing on the upstream surface.

According to an embodiment of the invention, the upstream surface of the deflector device comprises, or consists of, a portion defining a cone or a truncated cone, a center of which may coincide with the longitudinal central axis of the scrubber.

According to an embodiment of the invention, the scrubber comprises a restriction element extending inwardly from the casing towards the gas outlet, wherein the restriction element forms a tray between the restriction element and the casing, and wherein the tray is configured to collect scrubbing liquid to be drained from the scrubber.

According to an embodiment of the invention, the restriction element is provided upstream the deflector device.

In case of the scrubber comprising a drain pipe communicating with a drain outlet of the separation device, the drain pipe outlet may be arranged closer to the gas inlet of the casing than a downstream edge of the restriction element. This may enable arrangement of a drain pipe outlet in an area of the scrubber where the gas flow velocity is relatively low.

BRIEF DESCRIPTION OF THE DRAWINGS

The present invention is now to be explained more closely through a description of various embodiments and with reference to the drawings attached hereto.

FIG. 5 discloses schematically a longitudinal section of a part of the scrubber of FIG. 1.

FIG. 6 discloses schematically a longitudinal section of a part of a scrubber according to a second embodiment.

FIG. 7 discloses schematically a longitudinal section of a part of a scrubber according to a third embodiment.

DETAILED DESCRIPTION OF VARIOUS EMBODIMENTS

Figure 1:
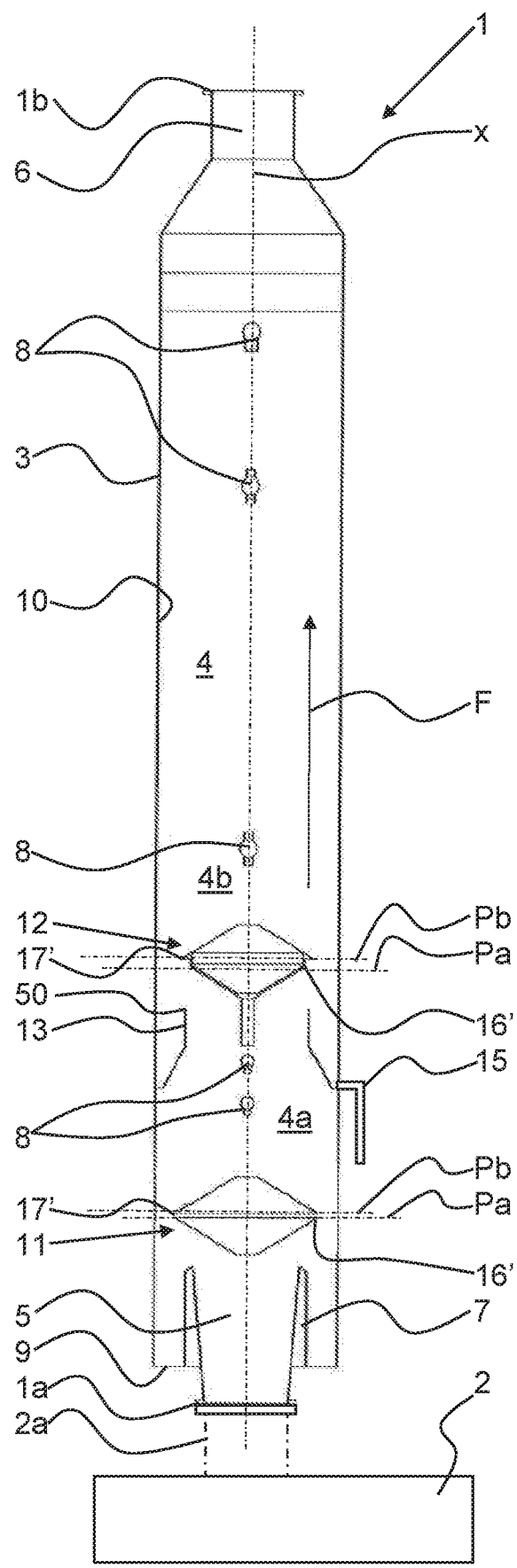
FIG. 1 discloses schematically a longitudinal section of a scrubber according to a first embodiment of the invention.

FIG. 1 discloses an inline scrubber 1 for cleaning of a gas, such as an exhaust gas from an engine, a burner a boiler, etc., for instance a marine vessel engine 2 schematically indicated in FIG. 1.

The scrubber 1 comprises a casing 3, which extends along a longitudinal central axis x, and encloses a scrubbing chamber 4. The longitudinal central axis x may be vertical as indicated in FIG. 1. The scrubber 1 has a first end 1a, that may form a lower end, and a second end 1b, that may form an upper end.

Figure 4:
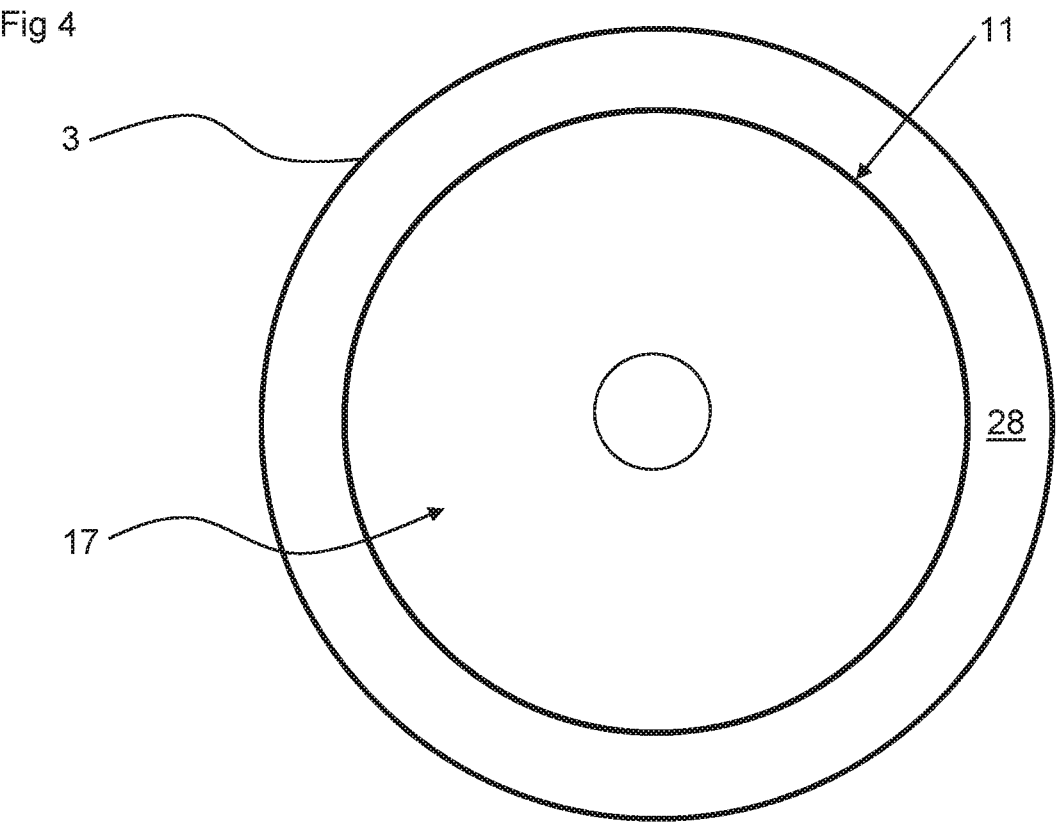
FIG. 4 discloses schematically a transversal section along the line IV-IV in FIG. 2.

In the first embodiment, the scrubber 1 and the casing 3 have a circular cross-section, see FIG. 4.

The casing 3 comprises a gas inlet 5 for the gas to be cleaned, and a gas outlet 6 for the cleaned gas. The gas inlet 5 is provided at the first end 1a and extends into the scrubbing chamber 4. The gas outlet 6 is provided at the second end 1b and extends out from the scrubbing chamber 4.

In the first embodiment, the gas inlet 5 and the gas outlet 6 are concentric with the longitudinal central axis x, see FIG. 1.

The casing 3 is configured to permit a gas flow of the gas to flow through the scrubbing chamber 4 in a flow direction F from the gas inlet 5 to the gas outlet 6.

The gas inlet 5 comprises an inlet tube 7 which is connected to an exhaust pipe 2a of the marine vessel engine 2. The inlet tube 7 extends into the scrubbing chamber 4 at the first end 1a, see also FIG. 2. The exhaust pipe 2a and the inlet tube 7 may extend in line with the longitudinal central axis x.

The scrubber 1 comprises at least one spraying nozzle 8 configured to spray a scrubbing liquid into the scrubbing chamber 4 and into the gas flow. In the embodiments disclosed, the scrubber 1 comprises a plurality of spraying nozzles 8, for instance five spraying nozzles 8, as indicated in FIG. 1. The number of spraying nozzles 8 may be adapted to the design and the size of the scrubber 1. Each spraying nozzle 8 may be directed towards the gas inlet 5 and/or towards the gas outlet 6, see the exemplified directions in FIG. 1.

Figure 2:
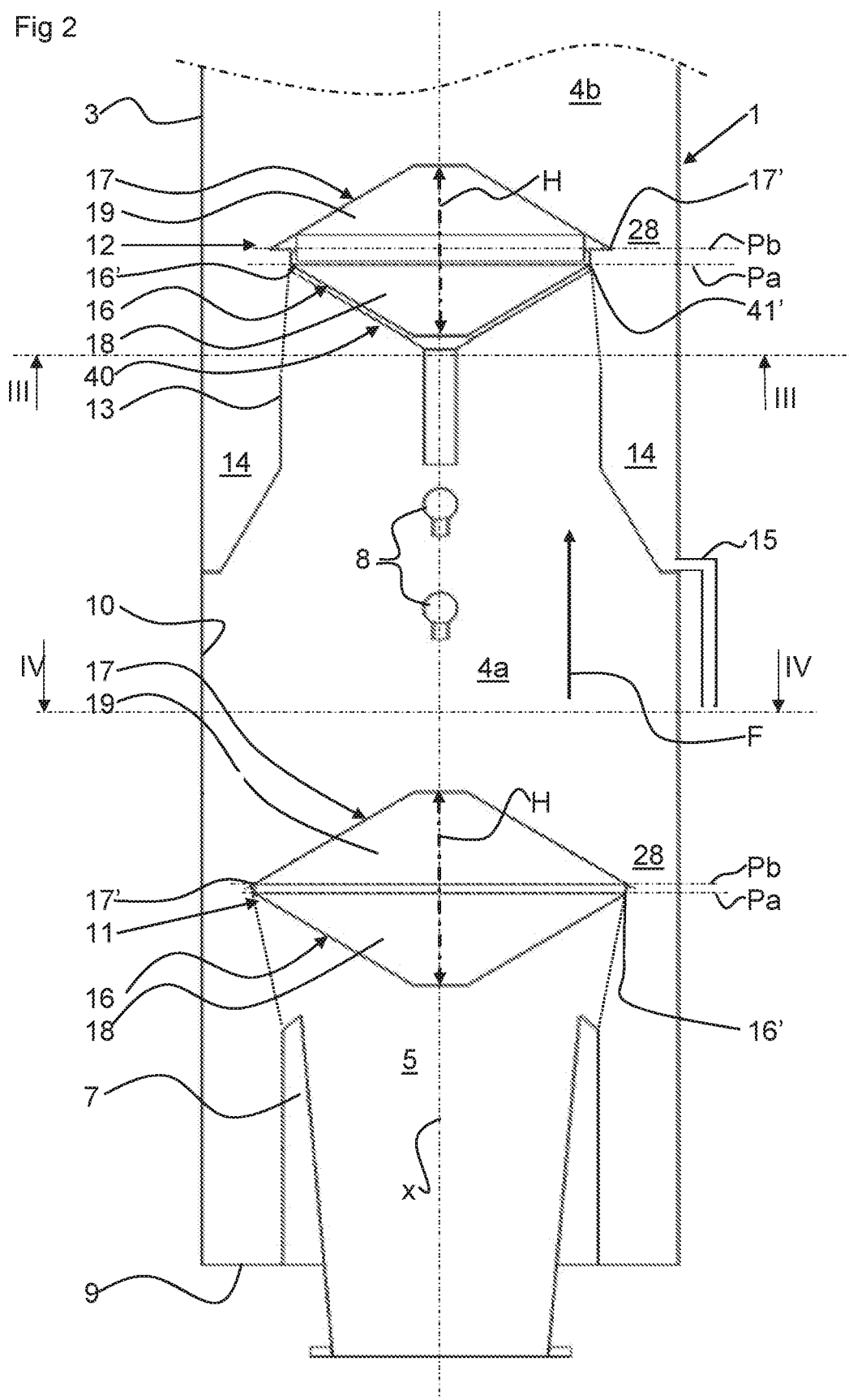
FIG. 2 discloses schematically a longitudinal section of a part of the scrubber in FIG. 1.

The scrubber 1 comprises liquid outlet means for discharging used scrubbing liquid from the scrubbing chamber 4. A first liquid outlet 9 of the liquid outlet means is provided outside the gas inlet 5. In the first embodiment, the first liquid outlet 9 may be annular and extend around the inlet tube 7 between an inner side 10 of the casing 3 and the inlet tube 7, as can be seen in FIGS. 1 and 2. Used scrubbing liquid, flowing along the inner side 10 of the casing 3, may be discharged via the first liquid outlet 9.

The scrubber 1 comprises at least one deflector device 11, 12 provided in the scrubbing chamber 4, concentrically with the casing, between the gas inlet 5 and the gas outlet 6. In the first embodiment, two deflector devices 11, 12 are provided, one upstream deflector device 11 and one downstream deflector device 12.

The spraying nozzles 8 are arranged between the gas outlet 6 of the casing 3 and the upstream deflector device 11.

The upstream deflector device 11 may be provided close to the gas inlet 5 and function as a cover preventing scrubbing liquid from entering the gas inlet 5 and the exhaust pipe 2a of the marine vessel engine 2. This can be seen in FIGS. 1 and 2, where the upstream deflector device 11 is provided just above the inlet tube 7.

The upstream deflector device 11 may be attached to the inlet tube 7 via suitable attachment bars, schematically indicated by dotted lines in FIG. 2.

The scrubber 1 may comprise a restriction element 13 extending inwardly from the casing 3 towards the gas outlet 6. The restriction element 13 forms an annular tray 14 between the restriction element 13 and the inner side 10 of the casing 3. The tray 14 is configured to collect used scrubbing liquid. A second liquid outlet 15 of the liquid outlet means extends from the tray 14 out from the casing 3 and permits discharge of used scrubbing liquid from the scrubbing chamber 4.

The restriction element 13 is provided downstream the upstream deflector device 11 and upstream the downstream deflector device 12, or in other words axially between the upstream deflector device 11 and the downstream deflector device 12.

The downstream deflector device 12 may be attached to the restriction element 13 via suitable attachment bars, schematically indicated by dotted lines in FIG. 2. Alternatively, the downstream deflector device 12 could be attached to the casing 3.

In the first embodiment, the scrubber 1 is a two-stage scrubber and comprises an upstream scrubbing section 4a adjacent to the gas inlet 5 and a downstream scrubbing section 4b adjacent to the gas outlet 6. The upstream deflector device 11 is provided in the upstream scrubbing section 4a. The downstream deflector device 12 is provided in the downstream scrubbing section 4b.

The restriction element 13 may form a transition from the upstream scrubbing section 4a to the downstream scrubbing section 4b.

The upstream deflector device 11 and the downstream deflector device 12 comprise a respective upstream deflector 18 having an upstream surface 16, see FIG. 2. The upstream surface 16 may cover the upstream deflector 18. The upstream surface 16 has an outer edge 16', which also may form the outer edge 16' of the upstream deflector 18. The upstream surface 16 extends from a respective upstream transversal plane Pa of the upstream and downstream deflector devices 11, 12 towards the gas inlet 5, see FIGS. 1 and 2. The upstream surface 16 tapers from the outer edge 16' located at the upstream transversal plane Pa towards the gas inlet 5. More particularly, the upstream surface 16 defines a truncated cone with circular cross section pointing towards the gas inlet 5 and having a center axis coinciding with the longitudinal central axis x.

The upstream deflector device 11 and the downstream deflector device 12 also comprise a respective downstream deflector 19 having a downstream surface 17. The downstream surface 17 may cover the downstream deflector 19. The downstream surface 17 has an outer edge 17', which also may form the outer edge 17' of the downstream deflector 19. The downstream surface 17 extends from a respective downstream transversal plane Pb of the upstream and downstream deflector devices 11, 12 towards the gas outlet 6, see FIGS. 1 to 3. The downstream surface 17 tapers from the outer edge 17' located at the downstream transversal plane Pb towards the gas outlet 6. More particularly, the downstream surface 17 defines a truncated cone with circular cross section pointing towards the gas outlet 6 and having a center axis coinciding with the longitudinal central axis x.

The transversal planes Pa, Pb are perpendicular to the longitudinal central axis x.

Figure 3:
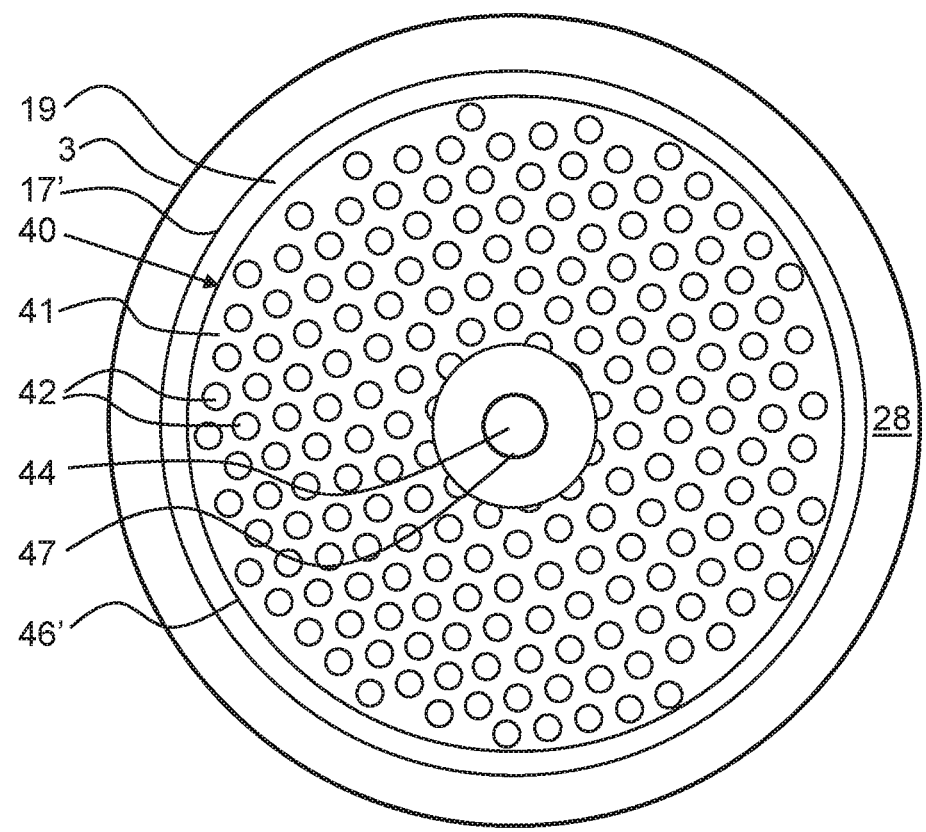
FIG. 3 discloses schematically a transversal section along the line III-III in FIG. 2.

In the first embodiment, both the upstream deflector device 11 and the downstream deflector device 12 have a circular shape, when seen in the direction of the longitudinal central axis x, and form a respective annular passage 28 between the deflector device 11, 12 and the casing 3, see FIGS. 3 and 4.

The scrubbing chamber 4 has a smaller flow area at the passage 28 than upstream and downstream the passage 28. Due to the conical shape of the upstream and downstream surfaces 16, 17 of the deflector devices 11, 12, the passage 28 between the deflector device 11, 12, respectively, and the casing 3 has a varying width. A most narrow portion of the passage 28 is located at the downstream transversal plane Pb and/or at the upstream transversal plane Pa.

The diameter of the downstream deflector device 12 may, but does not have to, be smaller than the diameter of the upstream deflector device 11 as is indicated in FIG. 2.

The upstream and downstream deflector devices 11, 12 have a respective height H from the upstream surface 16 to the downstream surface 17, see FIG. 2. The height H of the upstream deflector device 11 may differ from the height H of the downstream deflector device 12.

The scrubber 1 comprises a separation device 40, which comprises a shield element 41. The shield element 41 is arranged between the upstream surface 16 of the downstream deflector device 12 and the gas inlet 5, see FIGS. 2, 3 and 5. In the first embodiment, the shield element 41 is arranged between the upstream surface 16 of the downstream deflector device 12 and the downstream surface 17 of the upstream deflector device 11. The shield element 41 shields, here completely, the upstream surface 16 of the downstream deflector 12 from the gas flow.

The shield element 41 is made of a metal sheet, e.g. of stainless steel or aluminum, formed into a truncated cone with circular cross section pointing towards the gas inlet 5. A center axis of the conical shield element 41 coincides with the longitudinal central axis x. As is illustrated especially in FIG. 5, the downstream deflector device 12 is partly received inside the truncated cone defined by the shield element 41 wherein the shield element 41 encloses the upstream surface 16 of the downstream deflector device 12.

The shield element 41 is perforated by a plurality of holes 42, which cover a total hole area that constitutes approximately 35%, of the total area of the shield element 41. The holes 42 have a diameter of approximately 5 mm.

The shield element 41 is arranged separated from the upstream surface 16 of the downstream deflector device 12 to provide a collecting gap 43 between the upstream surface 16 of the downstream deflector device 12 and the shield element 41, see FIG. 5. The plurality of holes 42, which extend through the shield element 41, permit scrubbing liquid to enter the collecting gap 43.

The truncated cones defined by the shield element 41 and the upstream surface 16 of the downstream deflector device 12 are essentially uniform. This means that a width D of the collecting gap 43, which is equal to a perpendicular distance between the shield element 41 and the upstream surface 16 of the downstream deflector device 12, will be essentially uniform along the upstream surface 16. The width D may be 1-15 mm or even more, see FIG. 5.

The separation device 40 also comprises an edge member 46' in the form of a wall 46 extending, in parallel with the longitudinal central axis x, from an outer edge 41' of the shield element 41 towards the gas outlet 6. The wall 46 is annular and extends along the complete outer edge 41' of the shield element 41, i.e. all the way around the upstream deflector 18 of the downstream deflector device 12. The wall 46 is un-perforated.

As is clear from FIGS. 3 and 5, a projection of the downstream deflector 19 of the downstream deflector device 12 in a transverse plane extending perpendicularly to the longitudinal central axis x, which projection has an outer contour identical to the outer edge 17' of the downstream surface 17 and of the downstream deflector 19, is larger than a projection of the shield element 41 in the transverse plane, which projection has an outer contour identical to the outer edge 41' of the shield element 41. The downstream deflector 19 of the downstream deflector device 12 thus covers the shield element 41 as seen from the gas outlet 6, and the wall 46 extends towards an upstream surface of the downstream deflector 19.

The separation device 40 comprises a drain outlet 44 configured to drain the scrubbing liquid from the collecting gap 43. The drain outlet 44 extends through a central area 45 of the shield element 41 and is encircled by an edge of the metal sheet defining a top of the truncated conical shield element 41. Thus, the longitudinal central axis x extends through the drain outlet 44.

In the first embodiment, a drain pipe 47 communicating with the drain outlet 44 is provided. One end of the drain pipe 47 is widened to receive and enclose the central area 45 of the shield element 41. The drain pipe 47 is, at the widened end, fastened to the shield element 41 by welding, gluing or any other suitable fixing means. The drain pipe 47, which has a drain pipe outlet 49, is straight and extends towards the gas inlet 5 along the longitudinal central axis x. In the first embodiment, the drain pipe 47 extends towards the downstream surface 17 of the upstream deflector device 11. Scrubbing liquid from the collecting gap 43 may thus be drained towards the downstream surface 17 of the upstream deflector device 11 via the drain pipe 47.

As is clear from FIG. 2, the restriction element 13 has a varying diameter which results in a varying flow area of the gas flow through the restriction element 13. Typically, a smaller flow area is associated with an increased gas flow velocity. The drain pipe outlet 49 is arranged closer to the gas inlet 5 than a downstream edge 50 of the restriction element 13, see FIG. 1. More particularly, the drain pipe 47 extends through a most narrow portion of the restriction element 13 to shield the scrubbing liquid from a relatively high gas flow velocity.

Further Embodiments

FIG. 6 refers to a second embodiment that differs from the first embodiment in that no drain pipe communicating with the drain outlet 44 is provided such that the scrubbing liquid is drained from the collecting gap 43 along the longitudinal central axis x towards the downstream surface 17 of the upstream deflector device 11 directly through the drain outlet 44.

FIG. 7 refers to a third embodiment that differs from the first embodiment in that drain pipe 47 extends to a drain position at, or adjacent to, the inner side 10 of the casing 3, where the flow velocity of the gas passing towards the gas outlet 6 is lower than at a distance from the inner side 10 of the casing 3. The liquid may thus flow downwardly on the inner side 10 of the casing 3 to the first liquid outlet 9. Alternatively, the drain pipe 47 may extend to a position downstream or in the annular tray 14, to permit the drained scrubbing liquid to be discharged via the second liquid outlet 15.

FIGS. 1, 2 and 5 also illustrate a fourth embodiment that differs from the first embodiment in that the casing 3 has a cross-sectional shape that is rectangular, in particular square. The deflector surfaces 16, 17 and the shield element 41 may then have a roof-like shape, each with two plane surface areas that are inclined and form an angle with each other. The longitudinal section of FIGS. 1, 2 and 5 illustrate these two surface areas. According to a variant of the fourth embodiment, the deflector surfaces 16, 17 and the shield element 41 may have a pyramid-like shape.

It should be noted that the scrubber 1 may be a one-stage scrubber and so comprise only one scrubbing section 4a, 4b with only one deflector device 11, 12. The separation member 40 may then have a drain pipe 47 as disclosed in FIG. 7, permitting scrubbing liquid collected in the collecting gap 43 to be lead to the drain position at, or adjacent to, the inner side 10 of the casing 3.

The separation device 40 disclosed in FIG. 7 may be provided also upstream the upstream deflector device 11, wherein the drain pipe 47 may discharge scrubbing liquid collected in the collecting gap 43 to the inner side 10 of the casing 3, in particular to a drain position adjacent to the first liquid outlet 9.

Operation of the Scrubber 1

When operating the scrubber 1, exhaust gas is introduced from the marine vessel engine 2 via the gas inlet 5. The exhaust gas, that has a high temperature, is guided in the upstream scrubbing section 4a towards the upstream surface 16 of the upstream deflector device 11, where it is forced radially outwardly towards the passage 28. Due to the varying width of and in particular the decreased flow area at the passage 28, the velocity of the gas flow through the passage 28 is increased and is the largest at the most narrow portion of the passage 28.

Scrubbing liquid is introduced into the gas flow via the spraying nozzles 8 to react with sulfur, soot and particles in the exhaust gas. The scrubbing liquid will absorb the sulfur, soot and particles, and form droplets.

A part of the droplets are forced towards the inner side 10 of the casing 3. These droplets may then form a flow of liquid flowing towards the first liquid outlet 9 by means of the gravity force in a direction opposite to the flow direction F of the gas flow.

Another part of the droplets are flowing towards the downstream surface 17 of the upstream deflector device 11 in the middle of the upstream scrubbing section 4a, where the velocity of the gas flow is lower than in a more outward area. The droplets hitting the downstream surface 17 of the upstream deflector device 11 form a liquid flow on the downstream surface 17 towards the outer edge 17' and further towards the inner side 10 of the casing 3. The scrubbing liquid may the flow along the inner side 10 to the first liquid outlet 9 by means of the gravity force.

The flow area of the gas flow is reduced at the restriction element 13 resulting in an increase of the velocity of the gas flow when entering the downstream scrubbing section 4b. The exhaust gas from the upstream scrubbing section 4a is forced outwardly to the passage 28 between the downstream deflector device 12 and the inner side 10 of the casing 3, where the decreased flow area results in a further increased velocity of the gas flow in the same way as at the upstream deflector device 11.

At least a part of the droplets, which are entrained in the gas flow from the upstream scrubbing section 4a, will hit the shield element 41 of the separation device 40. The dynamic pressure will vary in the scrubbing chamber 4. In particular, the dynamic pressure outside the shield element 41 will be higher than in the collecting gap 43 between the shield element 41 and the upstream surface of the downstream deflector device 12. This pressure difference will force at least a part of the droplets, hitting the shield element 41, to enter the collecting gap 43 via the holes 42. The wall 46 of the separation device 40 extending from the outer edge 41' of the shield element 41 will prevent the scrubbing liquid from escaping from the collecting gap 43 at the outer edge 41'. The droplets will form a liquid flow downward along the upstream surface 16 of the downstream deflector device 12. At the central area 45 of the shield element 41, the liquid will be discharged via the drain outlet 44 and the pipe 47 towards the downstream surface 17 of the upstream deflector device 11 to be drained from the scrubber 1 together with the rest of the scrubbing liquid hitting the upstream deflector device 11 in the above described way.

Droplets not passing through the holes 42 but remaining on the upstream surface of the shield element 41 are guided towards the gas outlet 6 along the wall 46, caught by the upstream surface of the downstream deflector 19 of the downstream deflector device 12 and form a liquid flow downward to the tray 14 and the second liquid outlet 15 for drainage.

A part of the droplets entrained in the gas flow from the upstream scrubbing section 4a and formed in the downstream scrubbing section 4b, hit the inner side 10 of the downstream scrubbing section 4b and form a liquid flow downward to the tray 14 and the second liquid outlet 15 for drainage. Another part of these droplets hit the downstream surface 17 of the downstream deflector device 12 and form a liquid flow downward on the downstream surface 17 to the tray 14 and the second liquid outlet 15 for drainage.

The present invention is not limited to the embodiments disclosed but may be varied and modified and combined within the scope of the following claims.

For example, the scrubber 1 may comprise further spraying nozzles 8, also below the upstream deflector device 11, for example spraying nozzles 8 for cooling the exhaust gas arranged outside the gas inlet 5.

The casing 3, the deflector devices 11, 12 and the separation device 40 of the scrubber 1 according to the first embodiment are concentrically arranged and have uniform, circular cross sections. According to alternative embodiments, the casing 3 and/or the deflector device 11, 12 and/or the separation device 40 may be non-concentrically arranged and/or have other, such as oval, and/or different, cross sections.

The deflector devices 11, 12 and the separation device 40 of the first embodiment comprises truncated surfaces. Of course, alternative designs are possible. For example, one or both of the deflector devices 11, 12 and/or the separation device 40 could instead comprise one or more plane upstream/downstream surfaces.

The drain pipe need not be straight but could be curved or angled. Further, the drain pipe could be given any suitable length. Also, the drain pipe could be replaced by a tray open towards the gas outlet 6.

Finally, the drain outlet and/or the drain pipe need not be arranged in line with the longitudinal central axis x but could be displaced therefrom.

It should be stressed that a description of details not relevant to the present invention has been omitted and that the figures are just schematic and not drawn according to scale. It should also be said that some of the figures have been more simplified than others. Therefore, some components may be illustrated in one figure but left out in another figure. Furthermore, it should be stressed that expressions like "upper", "lower", "vertical", "horizontal", "longitudinal" etc., which have been chosen to describe and reflect the scrubber when this is in its normal state of operation, are used herein just to distinguish between different details of the scrubber. Thus, these expressions are in no way limiting.

The invention claimed is:

1. A scrubber for cleaning of a gas, comprising
a casing extending along a longitudinal central axis (x) and enclosing a scrubbing chamber, wherein the casing has a gas inlet for the gas to be cleaned, which extends into the scrubbing chamber, and a gas outlet for the cleaned gas, which extends out from the scrubbing chamber, wherein the casing is configured to permit a gas flow of the gas to flow through the scrubbing chamber in a flow direction from the gas inlet to the gas outlet,
a deflector device provided in the scrubbing chamber between the gas inlet and the gas outlet and forming a gas passage between the deflector device and the casing, which deflector device comprises an upstream surface facing the gas inlet, and
a spraying nozzle configured to spray a scrubbing liquid into the scrubbing chamber and the gas flow,
a separation device, which comprises a shield element arranged between the upstream surface of the deflector device and the gas inlet and at least partly shielding the upstream surface from the gas flow, which shield element is perforated by a plurality of holes, wherein the shield element is arranged so as to provide a collecting gap between the upstream surface and the shield element, and the holes extend through the shield element from the scrubbing chamber to the collecting gap to permit scrubbing liquid to enter the collecting gap, and wherein the separation device comprises a drain outlet configured to drain scrubbing liquid from the collecting gap.

2. The scrubber according to claim 1, wherein the shield element tapers towards the gas inlet.

3. The scrubber according to claim 1, wherein the shield element comprises a portion defining a truncated cone.

4. The scrubber according to claim 1, wherein the drain outlet extends from a central area of the shield element.

5. The scrubber according to claim 1, wherein the longitudinal central axis (x) extends through the drain outlet.

6. The scrubber according to claim 1, further comprising a drain pipe communicating with the drain outlet.

7. The scrubber according to claim 6, wherein the drain pipe extends towards the gas inlet.

8. The scrubber according to claim 1, wherein the separation device comprises a wall (46) extending from an outer edge of the shield element towards the gas outlet.

9. The scrubber according to claim 1, wherein the deflector device comprises a downstream deflector having a downstream surface facing the gas outlet, wherein a projection of the downstream deflector in a transverse plane extending perpendicularly to the longitudinal central axis is larger than a projection of the shield element in the transverse plane.

10. The scrubber according to claim 1, wherein the holes of the shield element cover a total hole area that is 25-45% of the total area of the shield element.

11. The scrubber according to claim 1, wherein the shield element defines a space in which the deflector device is received such that the shield element at least partly encloses the upstream surface of the deflector device.

12. The scrubber according to claim 1, wherein the upstream surface of the deflector device tapers towards the gas inlet.

13. The scrubber according to claim 1, wherein the upstream surface of the deflector device comprises a portion defining a truncated cone.

\* \* \* \* \*